(12) United States Patent
Sweeney et al.

(10) Patent No.: US 12,498,019 B2
(45) Date of Patent: Dec. 16, 2025

(54) CYCLOID GEAR ASSEMBLY WITH ALTERNATING CONTACT BETWEEN TRANSFER MEMBERS AND PINS AND RELATED TECHNOLOGY

(71) Applicant: Agility Robotics, Inc., Pittsburgh, PA (US)

(72) Inventors: Kevin Sweeney, Albany, OR (US); Jonathan Hurst, Albany, OR (US)

(73) Assignee: Agility Robotics, Inc., Pittsburgh, PA (US)

( * ) Notice: Subject to any disclaimer, the term of this patent is extended or adjusted under 35 U.S.C. 154(b) by 0 days.

(21) Appl. No.: 18/625,672

(22) Filed: Apr. 3, 2024

(65) Prior Publication Data
US 2025/0264147 A1     Aug. 21, 2025

Related U.S. Application Data

(60) Provisional application No. 63/569,683, filed on Mar. 25, 2024, provisional application No. 63/554,680, filed on Feb. 16, 2024.

(51) Int. Cl.
    *F16H 1/32*     (2006.01)

(52) U.S. Cl.
    CPC ......... *F16H 1/32* (2013.01); *F16H 2001/323* (2013.01); *F16H 2001/325* (2013.01)

(58) Field of Classification Search
    CPC ......... F16H 2001/325; F16H 2001/323; F16H 1/32; F16H 19/08; F16H 2001/326; F16H 2001/321
See application file for complete search history.

(56) References Cited

U.S. PATENT DOCUMENTS

| | | | |
|---|---|---|---|
| 1,831,577 A | | 11/1931 | Richer |
| 5,188,572 A | * | 2/1993 | Yamaguchi ............... F16H 1/32 475/168 |

(Continued)

FOREIGN PATENT DOCUMENTS

| | | | |
|---|---|---|---|
| CN | 101280824 A | * | 10/2008 |
| CN | 101666366 B | | 1/2012 |

(Continued)

OTHER PUBLICATIONS

CN101280824 translation (Year: 2008).*

(Continued)

*Primary Examiner* — Timothy Hannon

(57) ABSTRACT

A gear assembly in accordance with at least some embodiments of the present technology includes first and second supports extending circumferentially around an axis in first and second planes, respectively. The gear assembly further includes a first transfer member including first lobes and first troughs circumferentially alternating around the axis in a third plane. The gear assembly also includes a second transfer member including second lobes and second troughs circumferentially alternating around the axis in a fourth plane. The planes intersect the axis with the third and fourth planes between the first and second planes. The gear assembly further includes first and second pins circumferentially interspersed around the axis and extending between the first and second supports. The gear assembly transfers torque at least primarily via contact between the first pins and the first lobes and via contact between the second pins and the second lobes.

19 Claims, 10 Drawing Sheets

(56) References Cited

U.S. PATENT DOCUMENTS

| | | | |
|---|---|---|---|
| 9,005,065 B2* | 4/2015 | Huang | F16H 1/32 475/168 |
| 9,127,753 B2* | 9/2015 | Akiyoshi | F16H 3/62 |
| 11,607,800 B2 | 3/2023 | Zhang | |
| 2005/0014595 A1 | 1/2005 | Minegishi | |
| 2016/0053871 A1* | 2/2016 | Fecko | F16H 3/70 475/168 |
| 2017/0314666 A1* | 11/2017 | Furuuchi | F16H 57/0424 |
| 2024/0052923 A1* | 2/2024 | Wang | F16H 1/32 |

FOREIGN PATENT DOCUMENTS

| | | | | |
|---|---|---|---|---|
| JP | 6938332 B2 * | 9/2021 | | F16H 1/32 |
| WO | WO2015025827 A1 | 2/2015 | | |

OTHER PUBLICATIONS

JP6938332 translation (Year: 2021).*
International Search Report of Co-Pending PCT Application No. PCT/US25/15562.
Written Opinion of Co-Pending PCT Application No. PCT/US25/15562.
U.S. Appl. No. 18/625,672, filed Apr. 3, 2024; and.
H. Geyer, R. Blickhan, and A. Seyfarth, "Natural dynamics of spring-like running: Emergence of self-stability," in 5th International Conference on Climbing and Walking Robots, vol. 92, 2002.
R. Blickhan, A. Seyfarth, H. Geyer, S. Grimmer, H. Wagner, and M. Günther, "Intelligence by mechanics," Phil. Trans. R. Soc. A, vol. 365, No. 1850, pp. 199-220, 2007.
T. McGeer, "Passive dynamic walking," The International Journal of Robotics Research, vol. 9, No. 2, pp. 62-82, 1990.

* cited by examiner

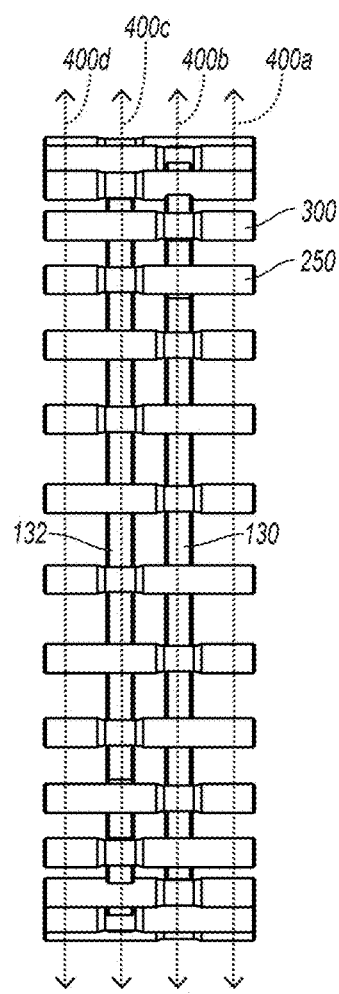
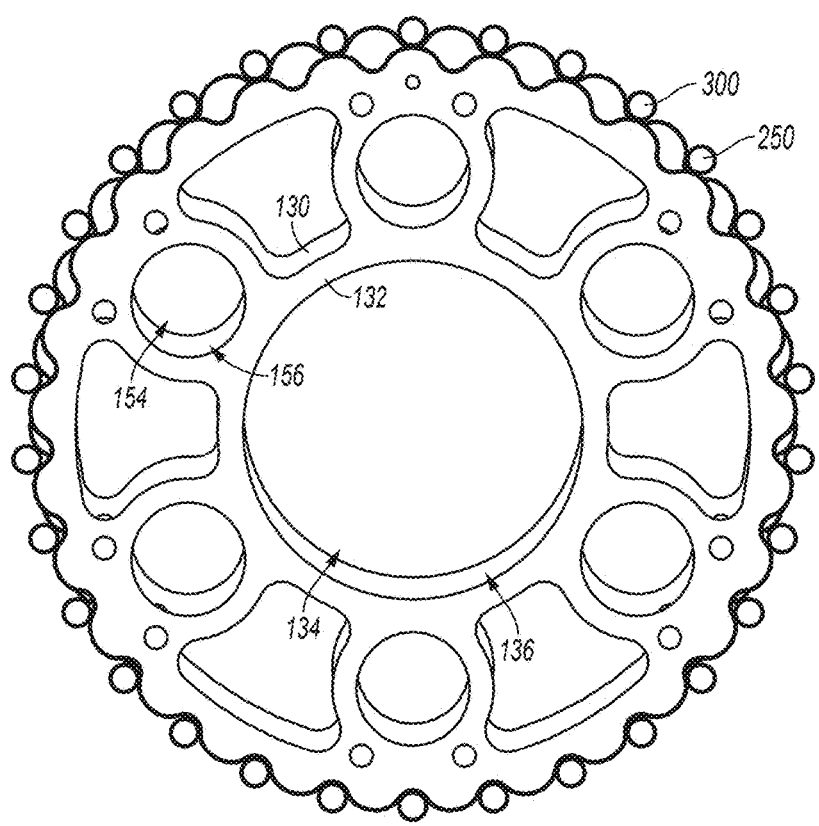
Fig. 10
Fig. 11

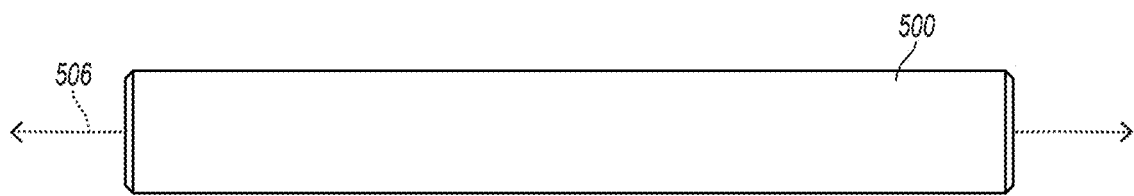
Fig. 14
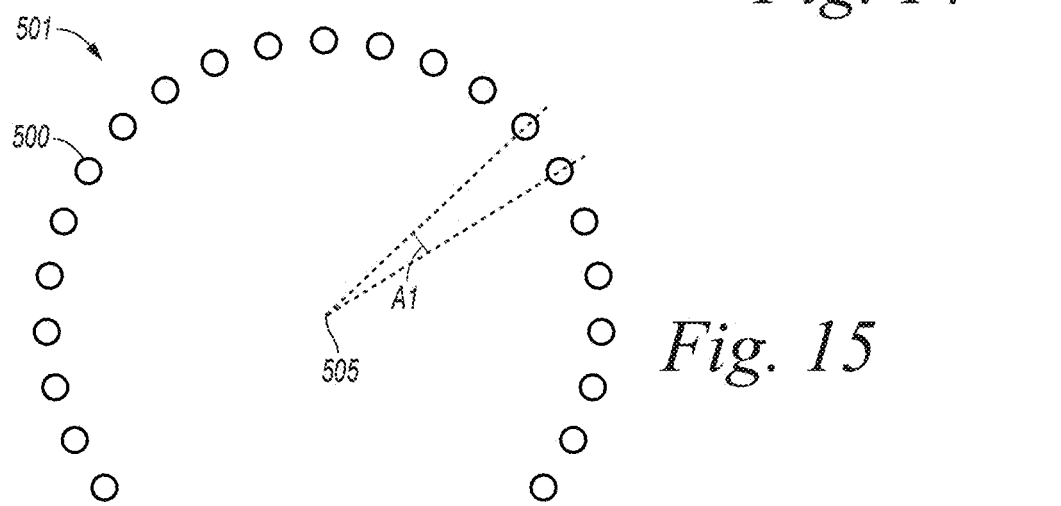
Fig. 15
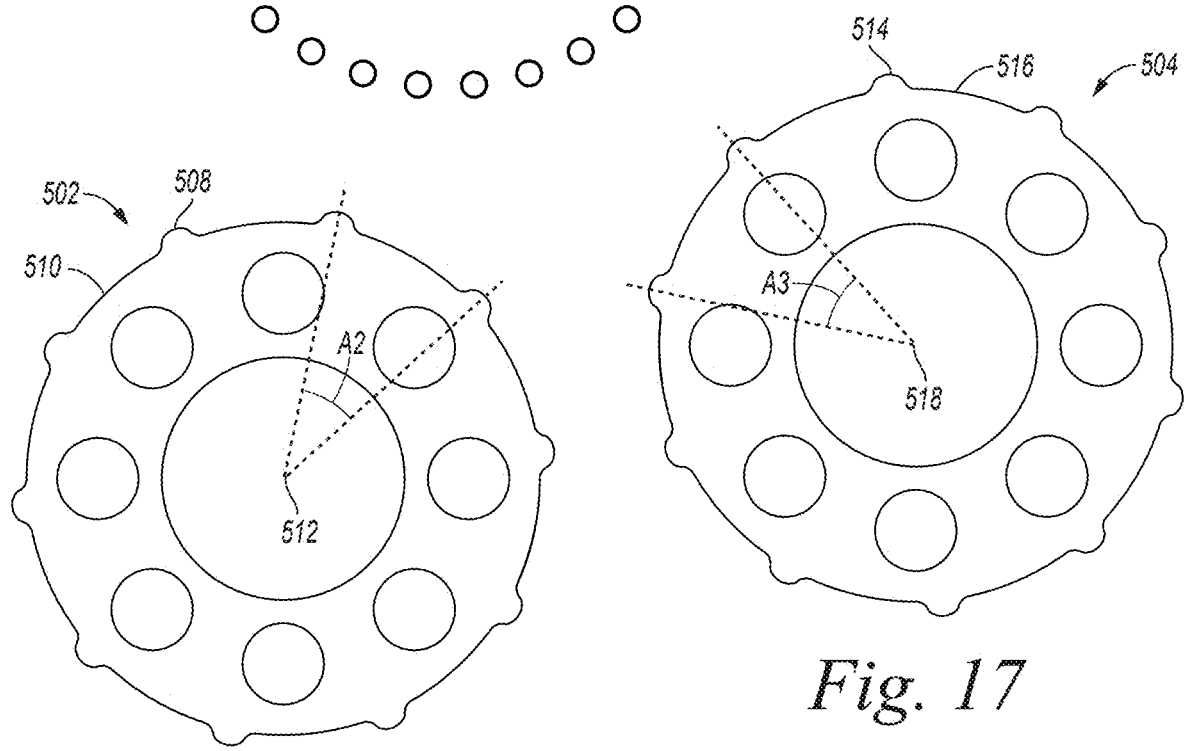
Fig. 16
Fig. 17

CYCLOID GEAR ASSEMBLY WITH ALTERNATING CONTACT BETWEEN TRANSFER MEMBERS AND PINS AND RELATED TECHNOLOGY

CROSS-REFERENCE TO RELATED APPLICATION

This claims the benefit of U.S. Provisional Application No. 63/554,680, filed Feb. 16, 2024 and U.S. Provisional Application No. 63/569,683, filed Mar. 25, 2024. Each of the foregoing applications is incorporated herein by reference in its entirety. To the extent the foregoing applications or any other material incorporated by reference conflicts with the present disclosure, the present disclosure controls.

TECHNICAL FIELD

The present technology relates to cycloid gear assemblies, such as cycloid gear assemblies of robot actuators.

BACKGROUND

Much of the work that humans currently perform is amenable to automation using robotics. For example, large numbers of human workers currently focus on executing actions that require little or no reasoning, such as predefined relocations of items and containers at order-fulfillment centers. Such actions may occur millions of times a day at a single order-fulfillment center and billions of times a day across a network of order-fulfillment centers. Human effort would be better applied to more complex tasks, particularly those involving creativity, advanced problem solving, and social interaction. Presently, however, the need for order-fulfillment centers is large and rapidly increasing. Some analysts forecast a shortage of a million or more workers to staff order-fulfillment centers within the next ten to fifteen years. Due to the importance of this field, even small improvements in efficiency can have major impacts on macroeconomic productivity. For at least these reasons, there is a significant and growing need for innovation that supports automating tasks that humans currently perform at order-fulfillment centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 10 and 11 are a side profile view and a front profile view, respectively, of transfer members and pins of the gear assembly of the actuator of FIG. 1.

FIGS. 14, 15, 16 and 17 are, respectively, a side profile view of a pin, a side profile view of a pin array, a side profile view of a first transfer member, and a side profile view of a second transfer member of a gear assembly of an actuator in accordance with another embodiment of the present technology.

DETAILED DESCRIPTION

Figure 1:
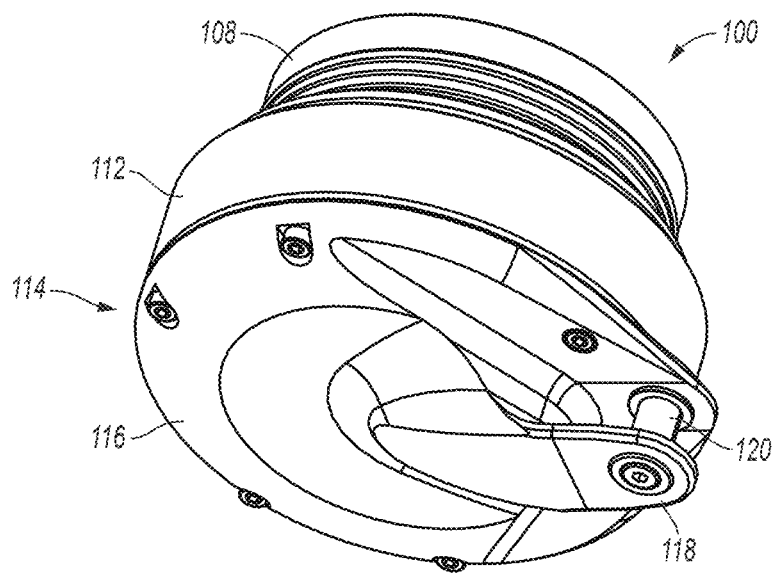
FIG. 1 is a perspective view of an actuator in accordance with at least some embodiments of the present technology.

Robots perform mechanical work via actuators. A typical actuator in an electromechanical robot includes an electrical motor and a gear assembly. The electrical motor uses electricity from a power source to rotate a shaft. In the absence of a load, the electrical motor rotates the shaft at very high speed. The gear assembly decreases this speed, thereby causing the output from the actuator to be more suitable for a controlled mechanical action, such as moving a robot link via a robot joint. Cycloid and strain-wave are two types (i.e., modalities) of gear assemblies used in advanced robotics. Performance categories that differentiate these types of gear assemblies include torque-to-weight ratio, torque-to-size ratio, reduction ratio, backlash, efficiency, miniaturizability, and shock resistance. Reduction ratio is the ratio of the number of revolutions per time of the input to the gear assembly over the number of revolutions per time of the output from the gear assembly. Backlash is the clearance or play between gears during operation, which, in excess, can cause imprecise and jerky movements. With exceptions, strain-wave gear assemblies tend to perform relatively well with respect to torque-to-weight ratio, torque-to-size ratio, backlash, and miniaturizability. Also with exceptions, cycloid gear assemblies tend to perform relatively well with respect to efficiency and shock resistance. Strain-wave gear assemblies have certain advantages at high reduction ratios whereas cycloid gear assemblies have certain advantages at lower reduction ratios. Different applications call for different reduction ratios, so the desirability of compatibility with higher or lower reduction ratios tends to be application specific. Furthermore, the noted performance differentiators are not universal. For example, a high-quality cycloid gear assembly may exhibit lower backlash than low-quality strain-wave gear assembly.

With respect to most performance categories, the differences between strain-wave and cycloid gear assemblies are small enough that either one is acceptable for a given application. Indeed, it is typical to accept performance tradeoffs in connection with selecting an actuator type for an application instead of attempting to maximize performance in all categories. Two notable exceptions to this approach, however, are miniaturizability and shock resistance. Performance in these categories tends to be determinative. Strain-wave gear assemblies often exhibit unacceptably low shock resistance. Moreover, this feature of strain-wave gear assemblies can be difficult to avoid because operating a strain-wave gear assembly involves deforming a flexspline, which must be flexible enough to accommodate the deformation. Good shock resistance and sufficient deformability tend to be mutually exclusive in practice. Accordingly, cycloid gear assemblies of all sizes tend to vastly outperform counterpart strain-wave gear assemblies in the category of shock resistance. Conventional cycloid gear assemblies, however, are prohibitively difficult to miniaturize beyond a certain level. Thus, where size is limited and high shock forces are possible, neither conventional strain-wave gear assemblies nor conventional cycloid gear assemblies are suitable. Moreover, there is room for improvement in conventional gear assemblies of all sizes and types, particularly with regard to cost and complexity. Conventional cycloid gear assemblies, for example, tend to have relatively large numbers of high-precision parts, which can make them relatively expensive and difficult to manufacture. For the foregoing and/or other reasons, there is a need for innovation in this field.

Gear assemblies and related devices, systems, and methods in accordance with embodiments of the present technology at least partially address one or more problems or limitations associated with conventional technologies. A gear assembly in accordance with a particular embodiment includes pins that bridge an area adjacent to two transfer members and engage the transfer members unequally during operation. This unequal engagement can include contacting one of the transfer members and remaining out of contact with the other. In an example, pins configured to engage a first transfer member and to avoid engaging a second transfer member are circumferentially interspersed with pins configured to engage the second transfer member and to avoid engaging the first transfer member. The unequal engagement can be associated with a difference in the shape of the pins, a difference in the orientation of the pins, a difference in the shape of the transfer members, and/or a difference in the orientation of the transfer members, among other options. Furthermore, the pins can extend between roller bearings of a type well suited to miniaturization. For example, the pins can extend between drawn-cup needle roller bearings at circumferentially distributed sockets of axially spaced apart supports. Gear assemblies in accordance with at least some embodiments of the present technology are expected to exhibit advantageous characteristics, such as a previously unavailable combination of miniaturizability and shock resistance.

The foregoing and other features of devices, systems, and methods in accordance with various embodiments of the present technology are further described below with reference to FIGS. 1-19. Although methods, devices, and systems may be described herein primarily or entirely in the context of actuators of mobile robots, other contexts are within the scope of the present technology. For example, suitable features of described methods, devices, and systems can be implemented in the context of stationary robots or in non-robot contexts that call for actuators with cycloid gearing, such as certain vehicles, pumps, winches, etc. Furthermore, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Actuators

Figure 2:
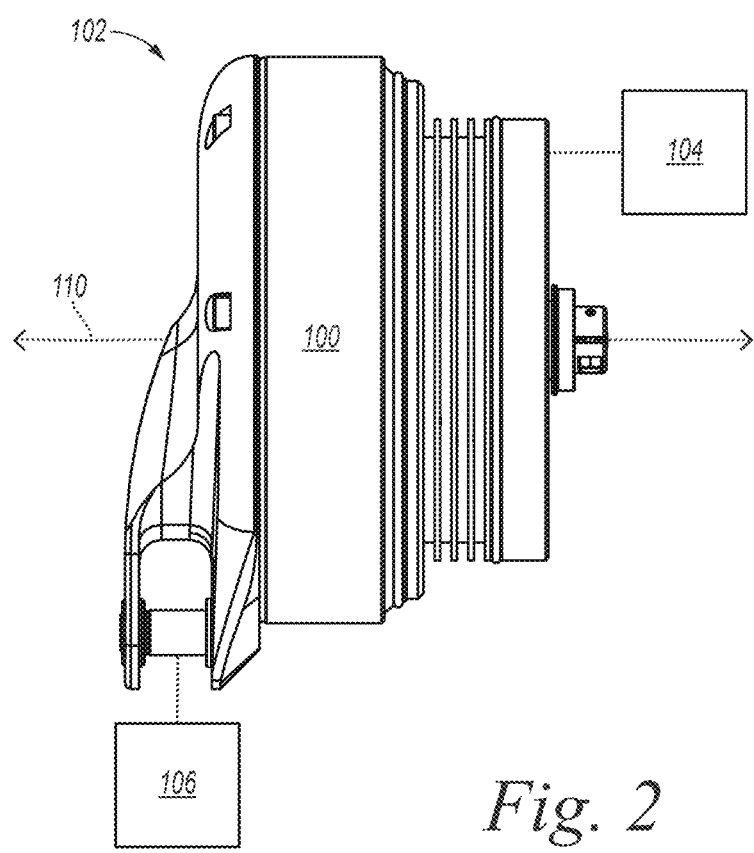
FIG. 2 is a partially schematic side profile view of a robot joint assembly including the actuator of FIG. 1 in accordance with at least some embodiments of the present technology.

FIG. 1 is a perspective view of an actuator 100 in accordance with at least some embodiments of the present technology. FIG. 2 is a partially schematic side profile view of a robot joint assembly 102 including the actuator 100 in accordance with at least some embodiments of the present technology. With reference to FIGS. 1 and 2 together, the robot joint assembly 102 can include a link 104 and rod 106 (both shown schematically) connected to one another via the actuator 100. In the illustrated embodiment, the actuator 100 is configured to move the rod 106 relative to the link 104. In another embodiment, as discussed below, a counterpart of the actuator 100 can be configured to cause an opposite relative motion. With reference again to FIGS. 1 and 2, the actuator 100 can include a motor 108 configured to convert electricity into torque. In at least some cases, the motor 108 is configured to rotate a shaft (not shown in FIGS. 1 and 2) about an axis 110. The actuator 100 can further include a gear assembly 112 through which the rod 106 is connected to the motor 108. The gear assembly 112 can include a crank 114 including a plate 116 shaped as a disk in a plane perpendicular to the axis 110. The crank can further include a yoke 118 carried by the plate 116 and a pivot 120 carried by the yoke 118. The pivot 120 can be cylindrical, have a laterally offset position relative to the axis 110, and have a long axis parallel to the axis 110. The rod 106 can be configured to rotate relative to the crank 114 via the pivot 120 as the actuator 100 moves the crank 114 relative to the link 104. Thus, the crank 114 can be an output member of the gear assembly 112. Other output members are also possible. For example, a counterpart of the actuator 100 can include an output shaft or another link in place of the crank 114.

Figure 3:
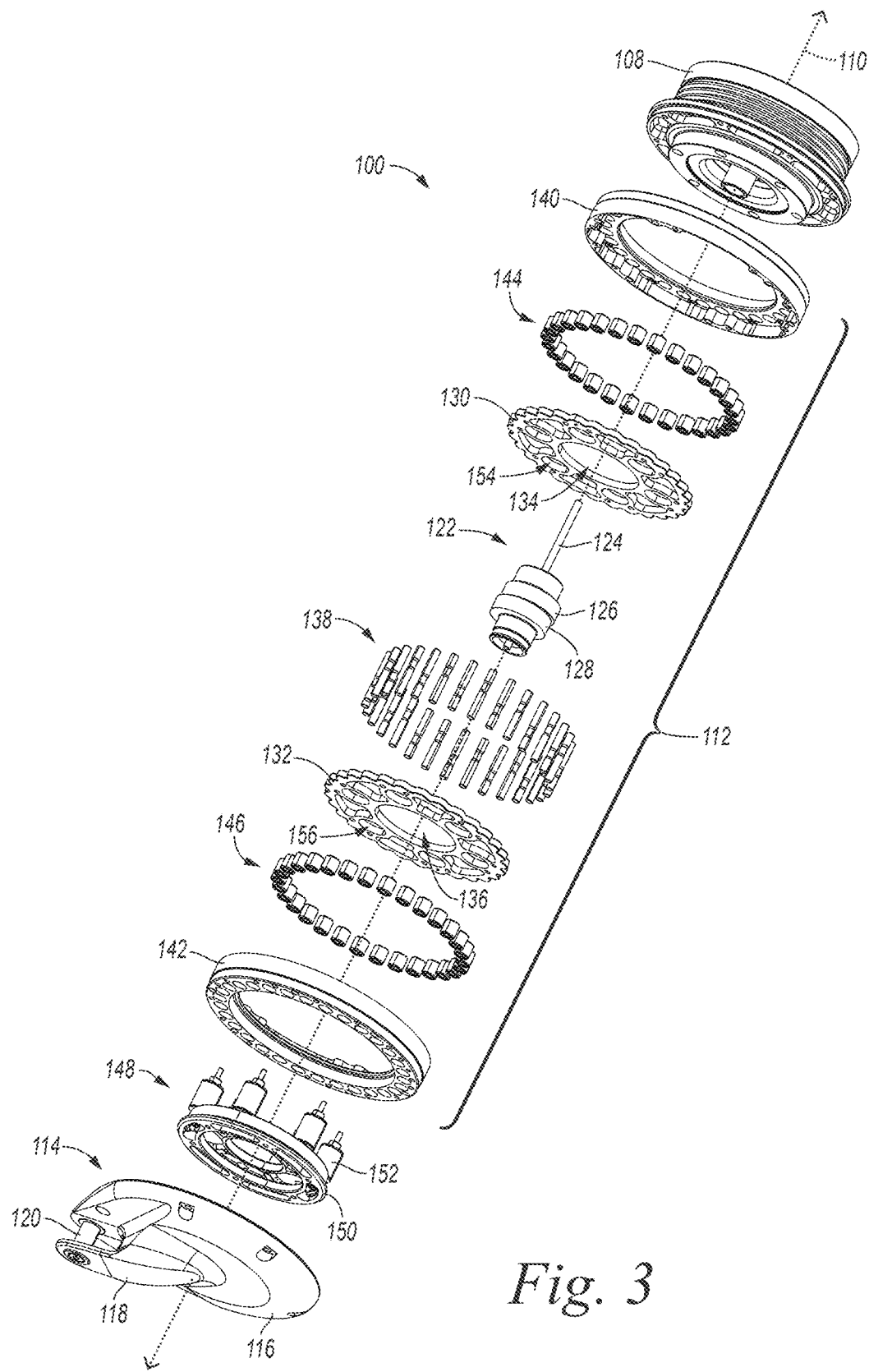
FIG. 3 is an exploded perspective view of selected components of the actuator of FIG. 1.

With reference again to the illustrated embodiment, FIG. 3 is an exploded perspective view of selected components of the actuator 100. As shown in FIG. 3, the gear assembly 112 can include cycloid-type internal structures. The gear assembly 112 can include an input assembly 122 kinematically downstream from the motor 108. As parts of the input assembly 122, the gear assembly 112 can include an input shaft 124 configured to rotate about the axis 110, a first eccentric bearing 126 carried by the input shaft 124, and a second eccentric bearing 128 also carried by the input shaft 124. The first and second eccentric bearings 126, 128 can be connected to the input shaft 124 at different respective positions along the axis 110. Furthermore, the first and second eccentric bearings 126, 128 can protrude radially from the input shaft 124 in circumferentially opposite respective directions relative to the axis 110. In at least some cases, the first and second eccentric bearings 126, 128 are not rotatable relative to the input shaft 124 about the axis 110. For example, the input shaft 124 and the first and second eccentric bearings 126, 128 can include complementary locking features (not shown), such as key and slot features, non-cylindrical interface features, etc. Thus, as the input shaft 124 rotates about the axis 110, protruding portions of the first and second eccentric bearings 126, 128 rotate out-of-phase with one another. The respective rotation of these protruding portions of the first and second eccentric bearings 126, 128 can be radially symmetrical about the axis 110. This can reduce or prevent vibration during operation of the actuator 100 and/or have other advantages.

The actuator 100 can further include a first transfer member 130 at a position along the axis 110 corresponding to a position of the first eccentric bearing 126 along the axis 110. The actuator 100 can also include a second transfer member 132 at a position along the axis 110 corresponding to a position of the second eccentric bearing 128 along the axis 110. The first transfer member 130 can define a first central opening 134 at which the first eccentric bearing 126 is rotatably disposed. The second transfer member 132 can define a second central opening 136 at which the second eccentric bearing 128 is rotatably disposed. Rotating the first and second eccentric bearings 126, 128 within the first and second central openings 134, 136, respectively, via the input shaft 124 can induce an eccentric wobble in the first and second transfer members 130, 132. This can include urging the first and second transfer members 130, 132 radially outward from the axis 110 in concert with the out-of-phase rotation of the protruding portions of the first and second eccentric bearings 126, 128. Thus, at any given time, a peripheral portion of the first transfer member 130 farthest from the axis 110 can be circumferentially opposite to a peripheral portion of the second transfer member 132 farthest from the axis 110. This relationship can persist as the first and second transfer members also rotate about the axis 110 in response to interaction with other components of the gear assembly 112, as discussed below. In some cases, the actuator 100 includes annular roller bearings (not shown) at interfaces between the first and second eccentric bearings 126, 128 and the first and second transfer members 130, 132, respectively. In other cases, outer surfaces of the first and second eccentric bearings 126, 128 slidingly contact inner surfaces of the first and second transfer members 130, 132 respectively.

With reference again to FIG. 3, the gear assembly 112 can further include structures that interact directly or indirectly with the first and second transfer members 130, 132 to generate torque. Among these structures, the gear assembly 112 can include a pin array 138, a first support 140, and a second support 142. Individual pins (not labeled in FIG. 3) of the pin array 138 can be elongate and can extend between the first and second supports 140, 142. A distribution of the pins within the pin array 138 can be radially symmetrical about the axis 110. The number of pins can correspond to a reduction ratio of the actuator 100. In at least some cases, the actuator 100 has an input-to-output reduction ratio within a range from 20:1 to 40:1, such as from 25:1 to 35:1. As discussed in detail below, there may be less load sharing among the pins in the gear assembly 112 than would occur in a conventional gear assembly. Although not necessary for realizing advantages of various embodiments of the present technology, a relatively high number of pins in the pin array 138 (e.g., at least 15 or at least 20) and a corresponding relatively high input-to-output reduction ratio (e.g., at least 15:1 or at least 20:1) can be advantageous to reduce or eliminate any difference in performance associated with this lesser load sharing. In some embodiments, individual pins of the pin array 138 are configured to rotate relative to the first and second supports 140, 142. To facilitate this rotation, the gear assembly 112 can include a first roller bearing array 144 and a second roller bearing array 146 at the first and second supports 140, 142, respectively. In another embodiment, a counterpart of the gear assembly 112 can include stationary pins configured to slidingly contact the first and second transfer members 130, 132. In general, however, the rotatability of the pins of the pin array 138 in the illustrated embodiment is expected to significantly increase the efficiency of the actuator 100.

Finally, the gear assembly 112 can include a carrier 148 configured to transfer torque from the first and second transfer members 130, 132 to the crank 114. The carrier 148 can include a base 150 and rods 152 (one labeled) individually extending from the base 150. The individual rods 152 can be cylindrical rollers with respective long axes (not shown) parallel to the axis 110. Furthermore, the rods 152 can be circumferentially distributed around the axis 110. In at least some cases, the first transfer member 130 defines first peripheral openings 154 (one labeled) also distributed circumferentially around the axis 110 and outwardly positioned relative to the first central opening 134. Similarly, the second transfer member 132 can define second peripheral openings 154 (one labeled) distributed circumferentially around the axis 110 and outwardly positioned relative to the second central opening 136. The individual rods 152 can extend through different respective pairs of one of the first peripheral openings 154 and one of the second peripheral openings 156. The crank 114 can be fixedly connected to the rods 152 via the base 150 such that force exerted against the rods 152 via rotation of the first and second transfer members 130, 132 about the axis 110 causes rotation of the crank 114 about the axis 110.

In some cases, the gear assembly 112 is configured to rotate the crank 114 or another output member relative to the link 104 or another mount fixedly connected to the first and second supports 140, 142. With regard to the carrier 148, this rotation can be in response to force exerted by the first and second transfer members 130, 132 against the base 150 via the rods 152. In other cases, output can be in the opposite direction. For example, a counterpart of the gear assembly 112 can include a mount (instead of the crank 114) fixedly connected to the base 150. This counterpart of the gear assembly 112 can be configured to rotate the first and second supports 140, 142 relative to the mount in response to force exerted by the first and second transfer members 130, 132 against the first and second supports 140, 142 via the pin array 138. In still other cases, a counterpart of the gear assembly 112 can be in a kinematic chain in which it causes a kinematically upstream component and a kinematically downstream component to rotate relative to one another simultaneously. Still other operational configurations are also possible.

Figure 4:
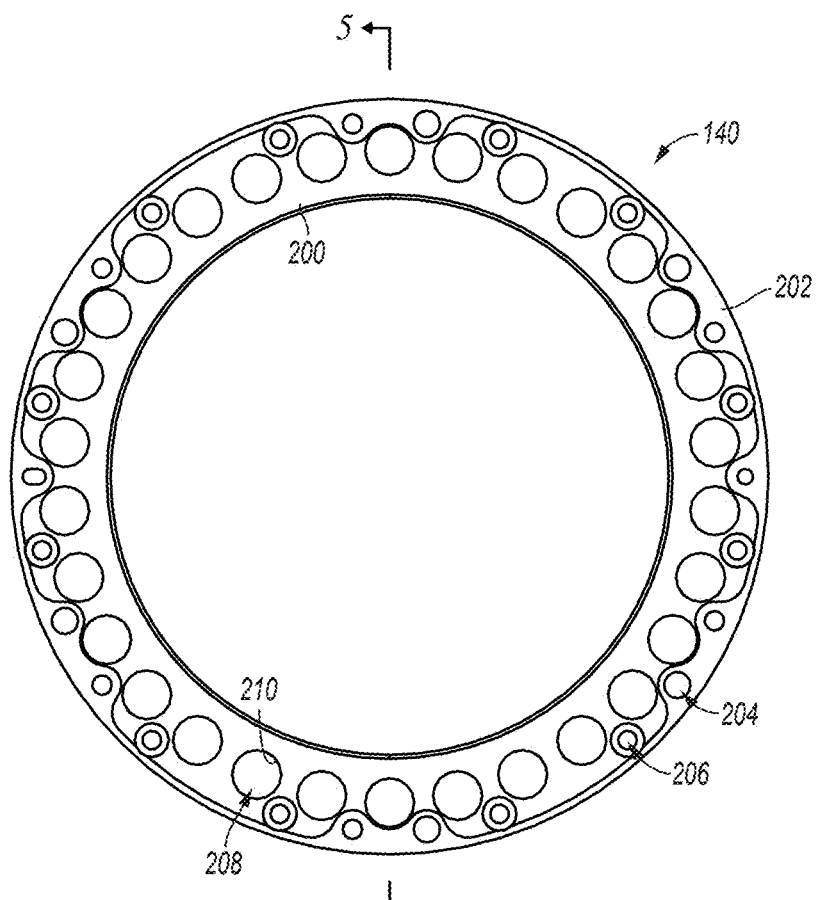
FIG. 4 is a front profile view of a first support of the actuator of FIG. 1.
Figure 5:
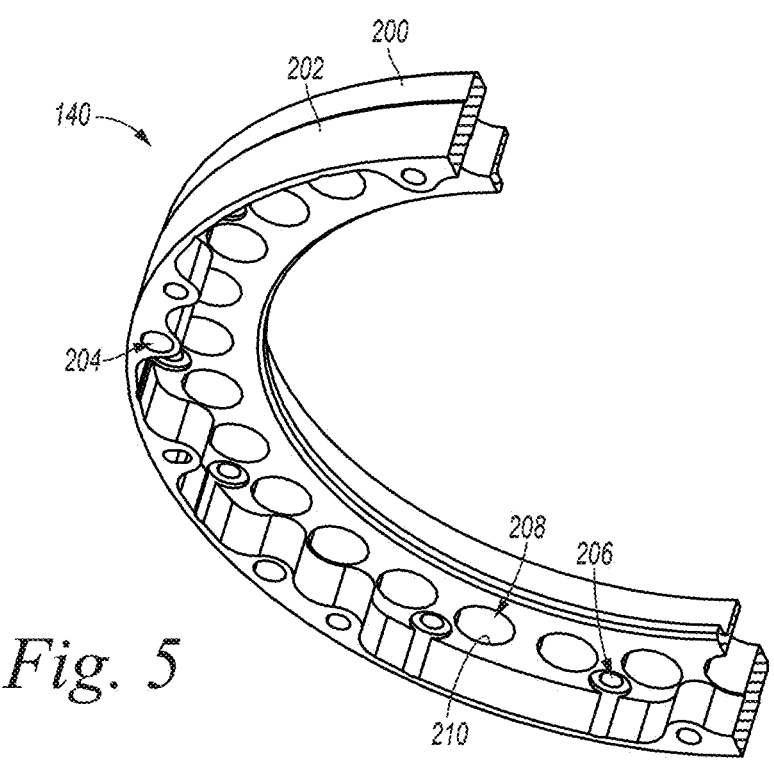
FIG. 5 is a cross-sectional perspective view of the first support of the actuator of FIG. 1 taken along the line 5-5 in FIG. 4.

With reference again to the illustrated embodiment, FIG. 4 is a front profile view of the first support 140. FIG. 5 is a cross-sectional perspective view of the first support 140 taken along the line 5-5 in FIG. 4. With reference to FIGS. 1-5 together, the first and second supports 140, 142 can be configured to be connected to one another around an annular area at peripheral portions of the first and second transfer members 130, 132. The first support 140 can include a plate 200 extending around the axis 110 and a collar 202 at an outer periphery of the plate 200 and extending from the plate 200 toward the second support 142 in a direction parallel to the axis 110. The first support 140 can define first fastener holes 204 (one labeled) extending through the plate 200 and the collar 202 in a direction parallel to the axis 110. The gear assembly 112 can include fasteners (e.g., threaded fasteners, pins, etc.) extending through the first fastener holes 204 that secure the first and second supports 140, 142 to one another. In at least some cases, these fasteners individually extend between and are in contact with the first and second supports 140, 142. The first support 140 can further define second fastener holes 206 (one labeled) extending through the plate 200. The gear assembly 112 can include fasteners (e.g., threaded fasteners, pins, etc.) extending through the second fastener holes 206 that secure the first support 140 to the motor 108.

The plate 200 can further define through holes 208 (one labeled) circumferentially distributed around the axis 110. The first support 140 can include sockets 210 (one labeled) at the through holes 208. The sockets 210 can also be circumferentially distributed around the axis 110. In some cases, the sockets 210 encompass the entire through holes 208. In other cases, the sockets 210 encompass portions of the through holes 208. Furthermore, counterparts in another embodiment of the present technology can be blind holes. With reference again to the illustrated embodiment, the second support 142 can have features similar to or the same as those of the first support 140. Features of the second support 142 may be referenced herein with reference numbers matching the reference numbers of corresponding features of the first support 140, but with an appended prime symbol. In another embodiment, a counterpart of the second support 142 can have different features. In addition or alternatively, counterparts of the first and second supports 140, 142 can be different portions of a unitary structure rather than separate structures.

Figure 6:
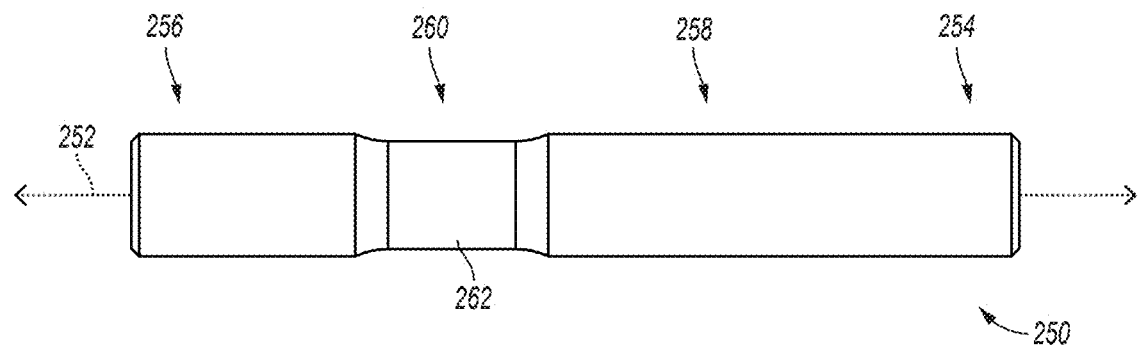
FIG. 6 is a side profile view of a first pin of the gear assembly of the actuator of FIG. 1.

FIG. 6 is a side profile view of a first pin 250 of the gear assembly 112. As shown in FIG. 6, the first pin 250 can be elongate and can define a length axis 252. The first pin 250 can include a first end portion 254 and a second end portion 256 opposite to one another along the length axis 252. The first pin 250 can further include a first intermediate portion 258 between the first and second end portions 254, 256 and a second intermediate portion 260 between the first intermediate portion 258 and the second end portion 256. The first pin 250 can be configured to contact the first transfer member 130 via the first intermediate portion 258 during operation of the gear assembly 112 as the first and second transfer members 130, 132 move out-of-phase with one another about the axis 110. In contrast, the first pin 250 can be configured to remain out of contact with the second transfer member 132 during operation of the gear assembly 112 as the first and second transfer members 130, 132 move out-of-phase with one another about the axis 110. Relatedly, the first pin 250 can have a non-uniform transverse cross-sectional area along the length axis 252. In particular, the first pin 250 can include an annular recess 262 at the second intermediate portion 260. In the gear assembly 112, the first end portion 254 of the first pin 250 can be at the first support 140, the second end portion 256 of the first pin 250 can be at the second support 142, the first intermediate portion 258 of the first pin 250 can contact the first transfer member 130, and the second intermediate portion 260 of the first pin 250 can remain out of contact with the second transfer member 132 via the annular recess 262. As discussed in detail below, the alternating contact relationship between the first and second pins 250, 300 and the first and second transfer members 130, 132 can facilitate miniaturization of the actuator 100 and/or have other advantages.

Figure 7:
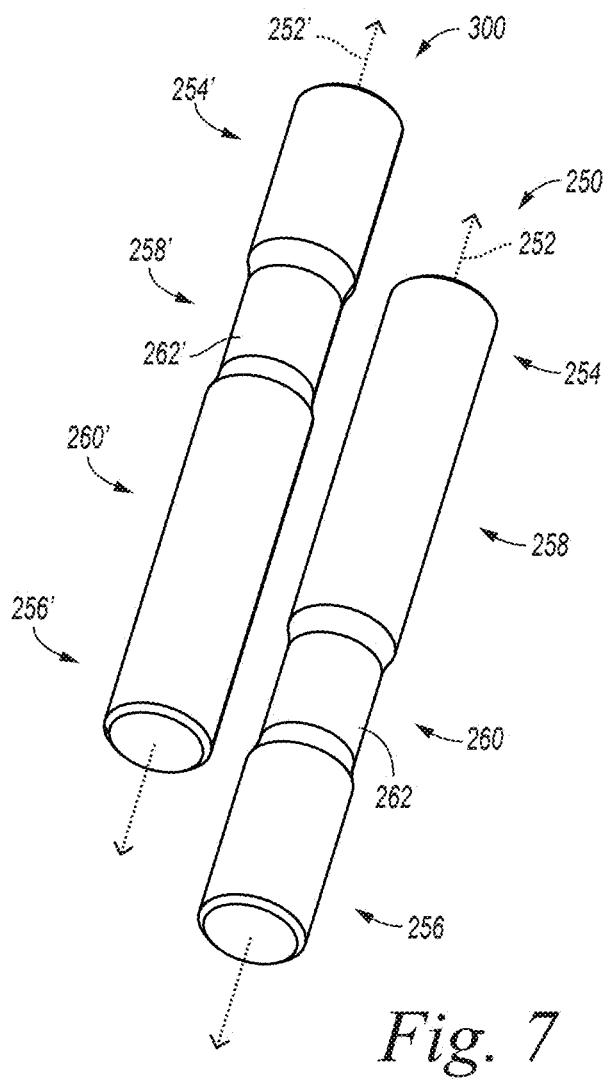
FIG. 7 is a perspective view of the first pin and a circumferentially neighboring second pin of the gear assembly of the actuator of FIG. 1.

FIG. 7 is a perspective view of the first pin 250 and a second pin 300 of the gear assembly 112 that circumferentially neighbors the first pin 250 within the pin array 138. Features of the second pin 300 are labeled in FIG. 7 and may be referenced herein with reference numbers matching the reference numbers of corresponding features of the first pin 250, but with an appended prime symbol. As shown in FIG. 7, the second pin 300 can be the same or similar to the first pin 250, but with the annular recess 262' at the first intermediate portion 258' rather than at the second intermediate portion 260'. Thus, in the gear assembly 112, the first end portion 254' of the second pin 300 can be at the first support 140, the second end portion 256' of the second pin 300 can be at the second support 142, the first intermediate portion 258' of the first pin 250 can remain out of contact with the first transfer member 130 via the annular recess 262', and the second intermediate portion 260' of the second pin 300 can contact the second transfer member 132. Within the pin array 138, the illustrated first pin 250 and other first pins 250 with the same features and orientation relative to the axis 110 as the illustrated first pin 250 can be circumferentially interspersed around the axis 110 with the illustrated second pin 300 and other second pins 300 with the same features and orientation relative to the axis 110 as the illustrated second pin 300. Distributions of the first and second pins 250, 300 around the axis 110 can be radially symmetrical.

Figure 8:
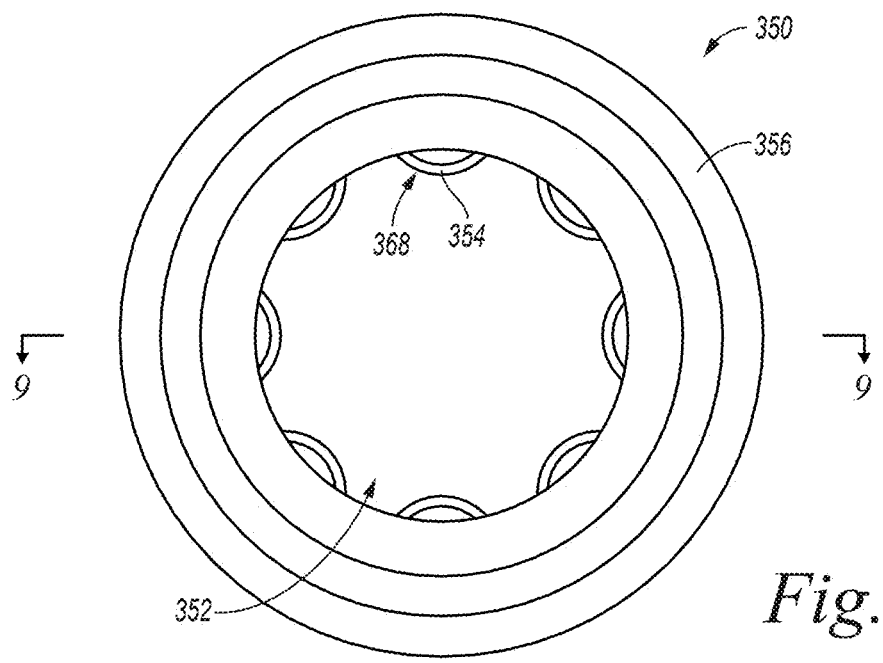
FIG. 8 is a front profile view of a roller bearing of the gear assembly of the actuator of FIG. 1.
Figure 9:
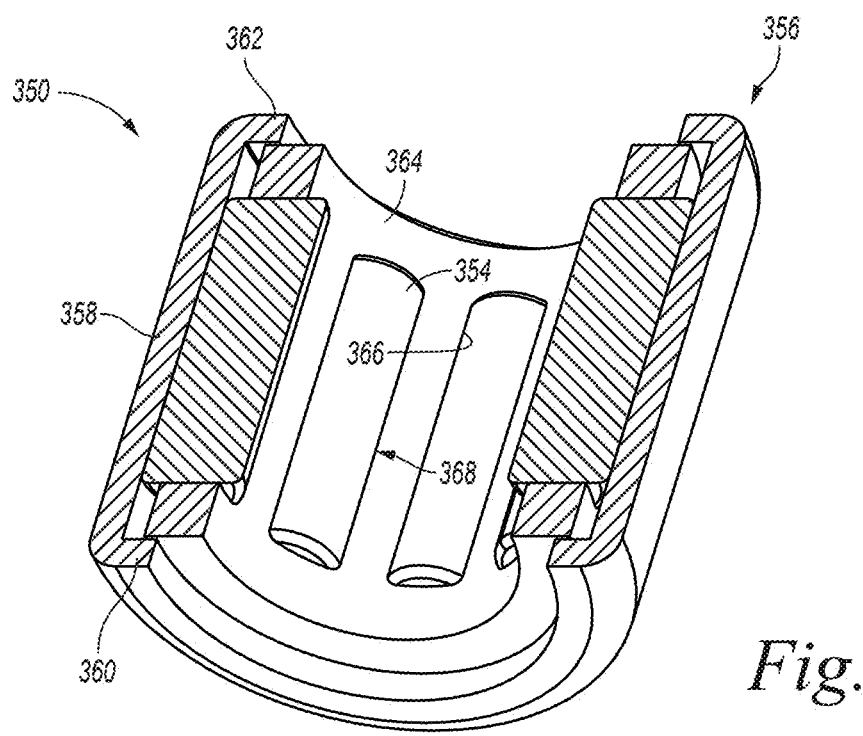
FIG. 9 is a cross-sectional perspective view of the roller bearing of the gear assembly of the actuator of FIG. 1 taken along the line 9-9 in FIG. 8.

FIG. 8 is a front profile view of a roller bearing 350 of the gear assembly 112. FIG. 9 is a cross-sectional perspective view of the roller bearing 350 taken along the line 9-9 in FIG. 8. With reference to FIGS. 1-9 together, the individual first pins 250 can be configured to rotate relative to the first and second supports 140, 142 in response to force (e.g., camming) from the first transfer member 130 (e.g., via a peripheral portion of the first transfer member 130) during operation of the gear assembly 112 as the first and second transfer members 130, 132 move out-of-phase with one another about the axis 110. Similarly, the individual second pins 300 can be configured to rotate relative to the first and second supports 140, 142 in response to force (e.g., camming) from the second transfer member 132 (e.g., via a peripheral portion of the second transfer member 132) during operation of the gear assembly 112 as the first and second transfer members 130, 132 move out-of-phase with one another about the axis 110. The roller bearing 350 and other roller bearings 350 within the first and second roller bearing arrays 144, 146 can reduce friction during operation of the gear assembly 112 and thereby increase the efficiency of the actuator 100. Locating the roller bearings 350 at interfaces between the first and second pins 250, 300 and the first and second supports 140, 142 rather than at interfaces between the first and second pins 250, 300 and the first and second transfer members 130, 132 can facilitate miniaturization of the actuator 100 and/or have other advantages.

As shown in FIGS. 8 and 9, the roller bearing 350 can define a cylindrical cavity 352 having a diameter corresponding to a diameter of the first and second end portions 254, 256, 254', 256' of the first and second pins 250, 300. The roller bearing 350 can include rollers 354 (one labeled) aligned with and circumferentially distributed around the cylindrical cavity 352. The roller bearing 350 can further include an annular frame 356 carrying the rollers 354. The annular frame 356 can include a cylindrical casing 358 extending around the rollers 354, a first lip 360 extending inwardly from the cylindrical casing 358 at one end of the cylindrical cavity 352 and a second lip 362 extending inwardly from the cylindrical casing 358 at an opposite end of the cylindrical cavity 352. The roller bearing 350 can further include a spacer 364 defining slots 366 in which the rollers 354 are respectively disposed. The individual rollers 354 can define a cylindrical outer surface 368 partially covered by the spacer 364 and the cylindrical casing 358 and partially exposed at the cylindrical cavity 352. The cylindrical casing 358 can be configured to resist hertzian contact stress, but not operating loads. Accordingly, the cylindrical casing 358 can be relatively thin and lightweight. The roller bearing 350 can be configured to resist deformation from operating loads at least primarily via encasement in an external structure.

In at least some cases, the roller bearing 350 is a drawn-cup needle roller bearing. Furthermore, the first and second pins 250, 300 can contact the cylindrical outer surfaces 368 of the rollers 354 directly. Due to these and/our other features, the roller bearings 350 can be well suited to miniaturization. In contrast to other types of roller bearings (e.g., machined-ring needle roller bearings), it can be advantageous for drawn-cup needle roller bearings to be supported externally to reduce or prevent deformation in response to high loads. In the illustrated embodiment, the roller bearings 350 are at the first and second supports 140, 142. For example, the individual roller bearings 350 can be at least partially disposed within the individual sockets 210. In the gear assembly 112, the first and second pins 250, 300 can individually extend between different respective pairs of one of the roller bearings 350 at the first support 140 and one of the roller bearings 350 at the second support 142.

FIGS. 10 and 11 are a side profile view and a front profile view, respectively, of the first and second transfer members 130, 132 and all of the first and second pins 250, 300 of the gear assembly 112 at a given time during operation of the gear assembly 112. FIG. 10 also shows four planes 400a-400d related to the relative positions of various portions of the gear assembly 112. With reference to FIGS. 1-11 together, the planes 400a-400d can intersect the axis 110 and be spaced apart from one another along the axis 110 at successively farther positions from the crank 114. The first support 140 can extend circumferentially around the axis 110 in the plane 400a. Correspondingly, the first end portions 254, 254' of the first and second pins 250, 300 can also be at the plane 400a. The second support 142 can extend circumferentially around the axis 110 in the plane 400d. Correspondingly, the second end portions 256, 256' of the first and second pins 250, 300 can also be at the plane 400d. The first and second transfer members 130, 132 can be at the planes 400b, 400c, respectively. The first intermediate portions 258, 258' of the first and second pins 250, 300 can be at the plane 400b. Similarly, the second intermediate portions 260, 260' of the first and second pins 250, 300 can be at the plane 400c. Due to the circumferentially staggered arrangement of the annular recesses 262, 262', a transverse cross-sectional area of the individual first pins 250 perpendicular to the length axis 252 can be smaller at the plane 400c than at the plane 400b and, likewise, a transverse cross-sectional area of the individual second pins 300 perpendicular to the length axis 252' can be smaller at the plane 400b than at the plane 400c.

Figure 12:
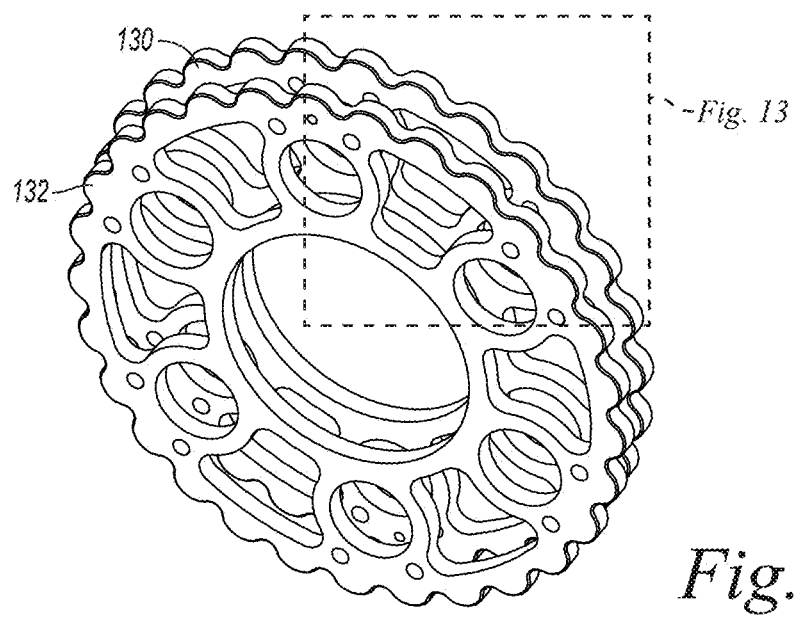
FIG. 12 is a perspective view of transfer members of the gear assembly of the actuator of FIG. 1.
Figure 13:
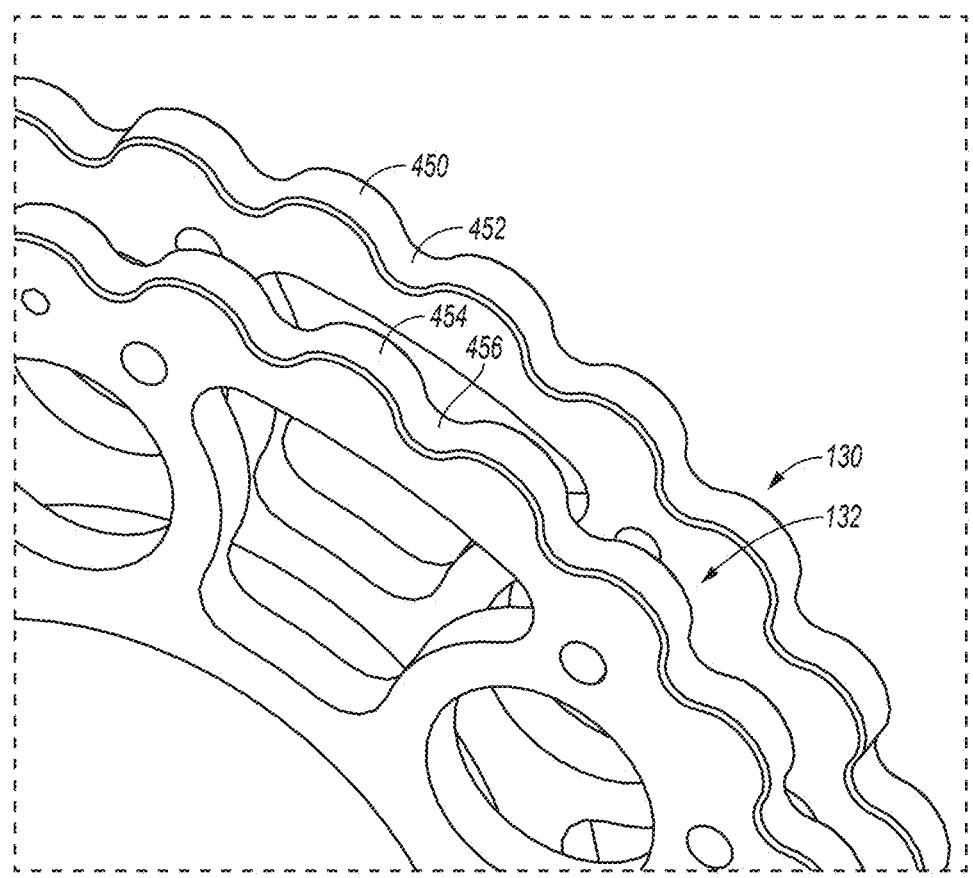
FIG. 13 is an enlargement of a portion of FIG. 12.

FIG. 12 is a perspective view of the just first and second transfer members 130, 132. FIG. 13 is an enlargement of a portion of FIG. 12. With reference now to FIGS. 1-13 together, the first transfer member 130 can include first lobes 450 and first troughs 452 circumferentially alternating around the axis 110 in the plane 400b. The first lobes 450 and first troughs 452 can form a first continuous sinusoidal profile through which the first transfer member 130 contacts the first pins 250 during operation of the gear assembly 112. Similarly, the second transfer member 132 can include second lobes 454 and second troughs 456 circumferentially alternating around the axis 110 in the plane 400c. The second lobes 454 and second troughs 456 can form a second continuous sinusoidal profile through which the second transfer member 132 contacts the second pins 300 during operation of the gear assembly 112. In other embodiments, counterparts of the first and second transfer members 130, 132 can have other suitable profiles, such as non-sinusoidal and/or discontinuous profiles. With reference again to the illustrated embodiment, the gear assembly 112 can be configured to transfer torque at least primarily via contact between the first pins 250 and the first lobes 450 and via contact between the second pins 300 and the second lobes 454 as the first and second transfer members 130, 132 move out-of-phase with one another about the axis 110 throughout a complete rotational cycle of gear assembly 112.

The alternating contact discussed above is different than a conventional cycloid gear assembly in which each counterpart of the first and second lobes 450, 454 engages each and every counterpart of the first and second pins 250, 300. Among other things, this difference can facilitate locating the rolling interface between the pins and the supports rather than between the pins and the transfer members. This is because, in a conventional cycloid gear assembly, a lobe of one transfer member and a trough of the other transfer member contact the same pin simultaneously. The lobe contact area and the trough contact area have different velocities. Rolling interfaces between the pins and the transfer members can accommodate this velocity differential whereas rolling interfaces between the pins and the supports would not. In contrast, with the alternating contact of the gear assembly 112, this limitation is reduced or eliminated such that the roller bearings 350 can be at the first and second supports 140, 142. Moreover, because the first and second supports 140, 142 have space for the sockets 210, the roller bearings 350 can be of a smaller and less expensive type (e.g., drawn-cup needle type as discussed above) than would otherwise be possible. Still further, the circumferential load distribution characteristic of the cycloid-type gearing modality is such that eliminating every other pin-to-transfer-member interface is not expected to adversely affect performance particularly when the number of pins is relatively high (e.g., greater than 15 or greater than 20). For the foregoing and/or one or more other reasons, the gear assembly 112 is expected to be more amenable to miniaturization than conventional counterparts. Moreover, the gear assembly 112 is expected to exhibit a higher torque-to-weight ratio and a higher torque-to-size ratio relative to conventional counterparts without unduly compromising backlash, efficiency, or shock resistance. Other advantages over conventional counterparts (e.g., reduced cost, reduced complexity, etc.) in addition to or instead of the foregoing advantages are also possible.

FIGS. 14, 15, 16 and 17 are, respectively, a side profile view of a pin 500, a side profile view of a pin array 501, a side profile view of a first transfer member 502, and a side profile view of a second transfer member 504 of a gear assembly of an actuator in accordance with certain additional embodiments of the present technology. In this alternative actuator, the pin 500 can be both a counterpart of the individual first pins 250 and a counterpart of the individual second pins 300. The pins 500 can be circumferentially distributed around an array axis 505 and collectively arranged in the pin array 501 as a counterpart of the pin array 138. Also in this alternative actuator, the first and second transfer members 502, 504 can be counterparts of the first and second transfer members 130, 132, respectively. As illustrated, a total number of the pins 500 in the pin array 501 can be one more than a total number of the first and second pins 250, 300 in the pin array 138. As further illustrated, peripheral profiles of the first and second transfer members 502, 504 can be significantly different than the peripheral profiles of the first and second transfer members 130, 132. Other features of the first and second transfer members 502, 504 can be generally similar to or the same as corresponding features of the first and second transfer members 130, 132. For example, although different in quantity relative to the first and second peripheral openings 154, 156, counterpart peripheral openings defined by the first and second transfer members 502, 504 can be functionally similar to the first and second peripheral openings 154, 156. Furthermore, the first and second transfer members 502, 504 can define fastener openings and voids for weight reduction as shown for the first and second transfer members 130, 132. Other features of the alternative actuator can likewise be the same as or similar to corresponding features of the actuator 100.

At a high level, the alternative actuator can cause alternating contact between the first and second transfer members 502, 504 and the pins 500 via omitted lobes at the peripheral profiles of the first and second transfer members 502, 504 rather than via non-uniform transverse cross-sectional areas of the pins 500. Accordingly, as shown in FIG. 14, the pin 500 can define a length axis 506 and can have a uniform transverse cross-sectional area perpendicular to the length axis 506. As shown in FIG. 16, the first transfer member 502 can include first lobes 508 and first troughs 510 that form a first profile through which the first transfer member 502 contacts some of the pins 500. An average circumferential span of the first lobes 508 about a first central axis 512 defined by the first transfer member 502 can be smaller than an average circumferential span of the first troughs 510 about the first central axis 512. Similarly, as shown in FIG. 17, the second transfer member 504 can include second lobes 514 and second troughs 516 that form a second profile through which the second transfer member 504 contacts some of the pins 500. An average circumferential span of the second lobes 514 about a second central axis 518 defined by the second transfer member 504 can be smaller than an average circumferential span of the second troughs 516 about the second central axis 518. In at least some cases, an average angle A1 (FIG. 15) relative to the first central axis 512 between circumferentially neighboring pairs of the pins 500 is no more than one third an average angle A2 (FIG. 16) between circumferentially neighboring pairs of the first lobes 508. Similarly, A1 may be no more than one third an average angle A3 (FIG. 17) between circumferentially neighboring pairs of the second lobes 514. In these and other cases, a total quantity of the first lobes 508 can be at most one third a total quantity of the pins 500. Furthermore, a total quantity of the second lobes 514 can be at most one third a total quantity of the pins 500.

Operating the alternative actuator can include bypassing contact between the first transfer member 502 and some of the pins 500 via the first troughs 510 and bypassing contact between the second transfer member 504 and some of the pins 500 via the second troughs 516. In the illustrated case, the number of first lobes 508 is equal to one third the number of pins 500 in the pin array 501 minus one. Likewise, the number of second lobes 514 is equal to one third the number of pins 500 in the pin array 501 minus one. In particular, the pin array 501 includes 31 of the pins 500, the first transfer member 502 includes ten of the first lobes 508, and the second transfer member 504 includes ten of the second lobes 514. In other cases, the counterparts of the pin array 501, the first transfer member 502, and the second transfer member 504 can include other suitable quantities of constituent elements circumferentially distributed evenly about the respective axes in the same or other suitable ratios. With reference again the illustrated embodiment, it is expected that the illustrated relationships between the quantity of the first lobes 508 and the quantity of the pins 500 and between the quantity of the second lobes 514 and the quantity of the pins 500 will result in the desired alternating contact between the first and second transfer members 502, 504 and the pins 500 without causing excessive antagonistic forces. For example, it is expected that instances of any of the pins 500 contacting both the first and second transfer members 502, 504 simultaneously will be reduced or eliminated relative to counterparts in which the lobe-to-pin ratio is lower (e.g., about 2:1 rather than about 3:1). Counterpart embodiments in which the lobe-to-pin ratio is higher may operate with desired alternating contact, but with potentially disadvantageous reduction in load sharing. Still other embodiments can include a combination of pin nonuniformity and lobe omission.

Examples of Robot Systems

Figure 18:
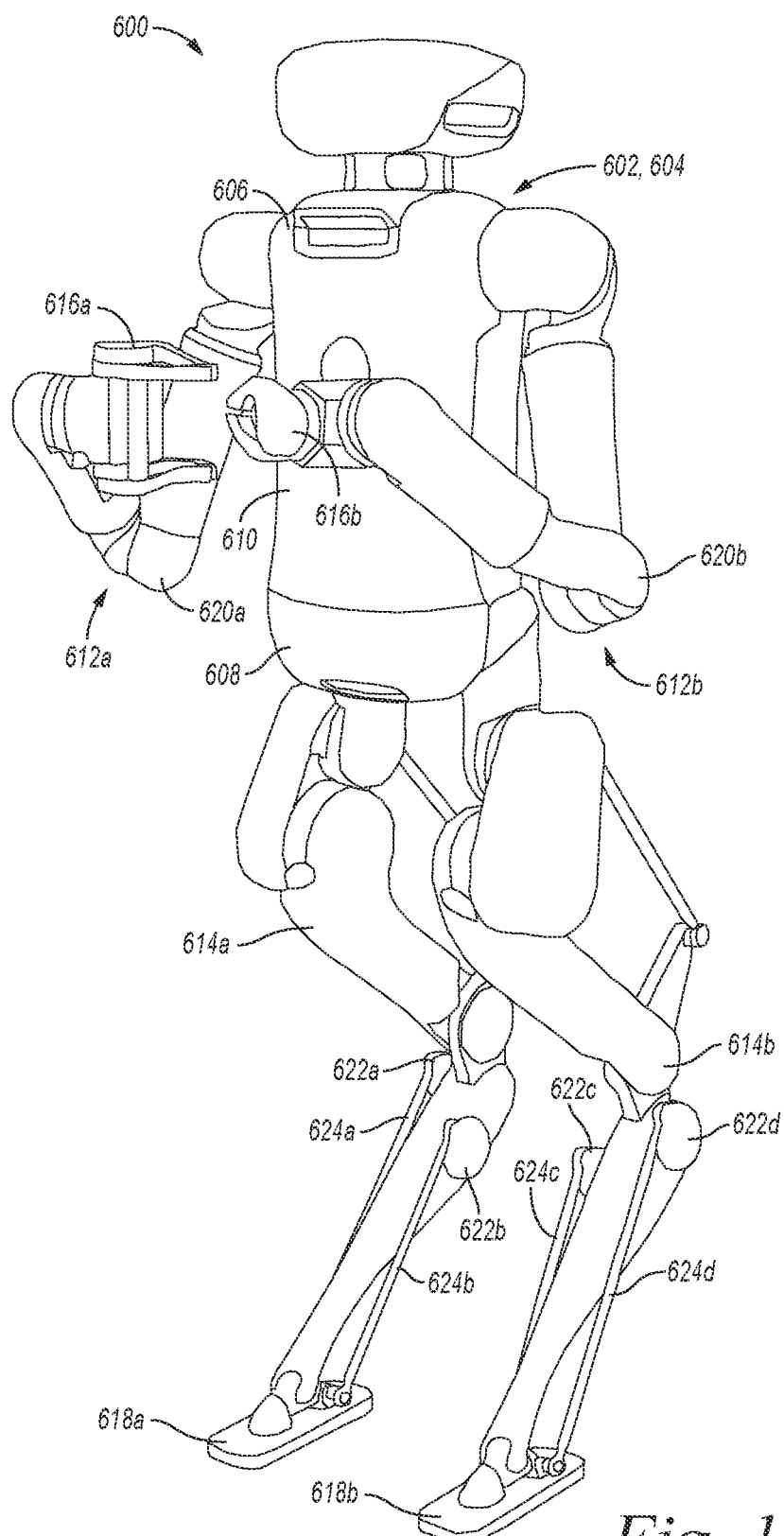
FIG. 18 is a perspective view of a mobile robot including an actuator in accordance with at least some embodiments of the present technology.

FIG. 18 is a perspective view of a mobile robot 600 including an actuator in accordance with at least some embodiments of the present technology. As shown in FIG. 18, the mobile robot 600 can include structures resembling human anatomy with respect to the features, positions, and/or other characteristics of such structures. In at least some cases, the mobile robot 600 defines a midsagittal plane about which the mobile robot 600 is bilaterally symmetrical. In these and other cases, the mobile robot 600 can be configured for bipedal locomotion similar to that of a human. Counterparts of the mobile robot 600 can have other suitable forms and features. For example, a counterpart of the mobile robot 600 can have a non-humanoid form, such as a canine form, an insectoid form, an arachnoid form, or a form with no animal analog. Furthermore a counterpart of the mobile robot 600 can be asymmetrical or have symmetry other than bilateral. Still further, a counterpart of the mobile robot 600 can be configured for non-bipedal locomotion. For example, a counterpart of the mobile robot 600 can be configured for another type of legged locomotion (e.g., quadrupedal locomotion, octopedal locomotion, etc.) and/or non-legged locomotion (e.g., wheeled locomotion, continuous-track locomotion, etc.).

The mobile robot 600 can include a centrally disposed body 602 through which other structures of the mobile robot 600 are interconnected. As all or a portion of the body 602, the mobile robot 600 can include a torso 604 having a superior portion 606, an inferior portion 608, and an intermediate portion 610 therebetween. The mobile robot 600 can further include articulated appendages carried by the torso 604. Among these articulated appendages, the mobile robot 600 can include arms 612*a*, 612*b* and legs 614*a*, 614*b*. In at least some cases, the mobile robot 600 is configured to manipulate objects via the arms 612*a*, 612*b*, such as bimanually. In these and other cases, the mobile robot 600 can be configured to ambulate via the legs 614*a*, 614*b*, such as bipedally. The arms 612*a*, 612*b* and the legs 614*a*, 614*b* can define kinematic chains. The kinematic chains corresponding to the arms 612*a*, 612*b*, for example, can provide at least five degrees of freedom, such as exactly five or exactly six degrees of freedom. In these and other cases, the kinematic chains corresponding to the legs 614*a*, 614*b* can provide at least four degrees of freedom, such as exactly four, exactly five, or exactly six degrees of freedom. As parts of the arms 612*a*, 612*b*, the mobile robot 600 can include end effectors 616*a*, 616*b* at distalmost portions of the corresponding kinematic chains. Similarly, as parts of the legs 614*a*, 614*b*, the mobile robot 600 can include feet 618*a*, 618*b* at distalmost portions of the corresponding kinematic chains. In the illustrated embodiment, the end effectors 616*a*, 616*b* and the feet 618*a*, 618*b* are not articulated. In other embodiments, counterparts of some or all of the end effectors 616*a*, 616*b* and the feet 618*a*, 618*b* can be articulated, such as with one or more movable fingers or toes.

At the individual articulations of the arms 612*a*, 612*b* and legs 614*a*, 614*b*, the mobile robot 600 can include a joint and a corresponding actuator. At least one of these actuators can correspond to the actuator 100, the alternative actuator corresponding to FIGS. 14-17, or another actuator in accordance with at least some embodiments of the present technology. For example, the mobile robot 600 can include actuators with cycloid-type gearing and circumferentially alternating contact between transfer members and pins in accordance with at least some embodiments of the present technology at joints of the arms 612*a*, 612*b*, at joints of the legs 614*a*, 614*b*, and/or elsewhere. In an example, the mobile robot 600 can include elbow joints 620*a*, 620*b* at or near midpoints along lengths of the respective arms 612*a*, 612*b*. The mobile robot 600 can include actuators corresponding to the actuator 100 at the respective elbow joints 620*a*, 620*b*. As another example, the mobile robot 600 can include foot actuators 622*a*-622*d* and connector rods 624*a*-624*d* operably associated with the feet 618*a*, 618*b*. In particular, the foot actuators 622*a*, 622*b* can be connected to the foot 618*a* via the connector rods 624*a*, 624*b*, respectively. Similarly, the foot actuators 622*c*, 622*d* can be connected to the foot 618*b* via the connector rods 624*c*, 624*d*, respectively. The mobile robot 600 can include actuators corresponding to the actuator 100 as one, some, or all of the foot actuators 622*a*-622*d*. Actuators in accordance with at least some embodiments of the present technology can be useful in many other locations in addition or alternatively. Furthermore, the mobile robot 600 is merely one example of a system in which features of at least some embodiments of the present technology can be implemented.

Examples of Methods

Figure 19:
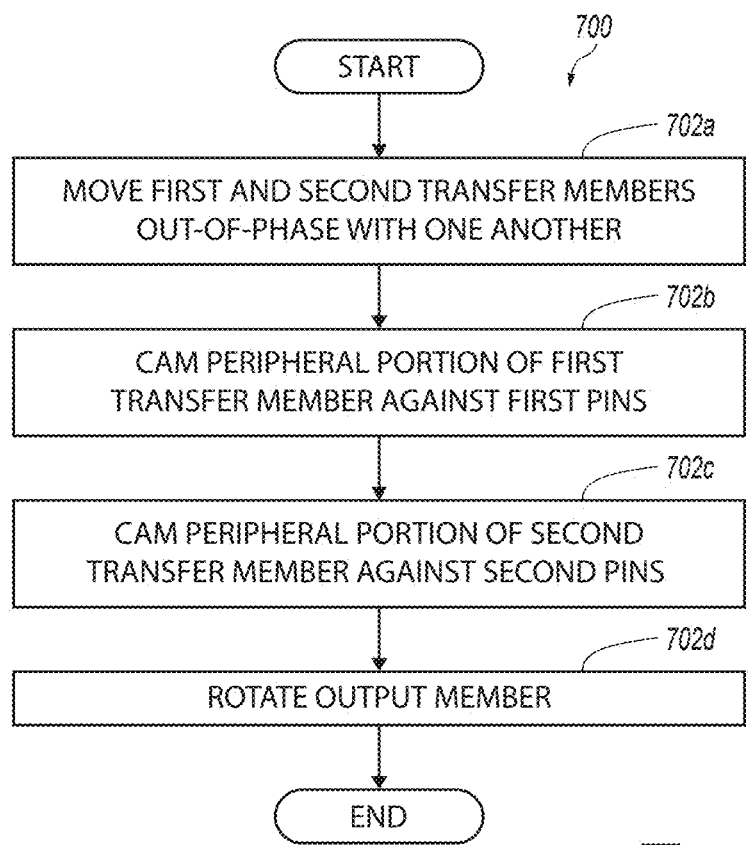
FIG. 19 is a block diagram corresponding to a method involving an actuator in accordance with at least some embodiments of the present technology.

FIG. 19 is a block diagram corresponding to a method 700 in accordance with at least some embodiments of the present technology. With reference to FIGS. 1-19 together, the method 700 can include causing the first and second transfer members 130, 132 to move out-of-phase (e.g., 180-degrees out-of-phase) with one another about the axis 110 (block 702*a*). This can include rotating the first and second eccentric bearings 126, 128 within the first and second central openings 134, 136, respectively. The method 700 can further include transferring force between a portion (e.g., a peripheral portion) of the first transfer member 130 and the first pins 250 (block 702*b*) (e.g., via a camming interaction therebetween) while the first and second transfer members 130, 132 move out-of-phase with one another about the axis 110. This can include contacting the first pins 250 and the first continuous sinusoidal profile defined by the first transfer member 130. Furthermore, this can include transferring force between the first lobes 450 and the first pins 250, such as by camming the first lobes 450 against the first pins 250. The contact between the first transfer member 130 and the first pins 250 can be at the first intermediate portion 258 of the first pins 250.

In at least some cases, the force transfer between the first transfer member 130 and the first pins 250 is preferential relative to force transfer (if any) between the first transfer member 130 and the second pins 300 throughout a complete rotational cycle of the gear assembly 112. The individual first pins 250 can avoid or otherwise reduce contact and/or force transfer with the second transfer member 132 while contacting and transferring force with the first transfer member 130. The lack of contact or otherwise non-preferential contact with the second transfer member 132 can be via the annular recesses 262 at the second intermediate portions 260 of the first pins 250. Relatedly, the method 700 can include maintaining clearance between the first pins 250 and the second transfer member 132 while the first and second transfer members 130, 132 move out-of-phase with one another about the axis 110. In the context of the pins 500 and the first and second transfer members 502, 504 (FIGS. 14-17), the pins 500 can include counterparts of the first pins 250 that avoid or otherwise reduce contact and/or force transfer with the second transfer member 504 while contacting and transferring force with the first transfer member 502. The lack of contact or otherwise non-preferential contact with the second transfer member 504 can be via the second troughs 516. Relatedly, the method 700 can include maintaining clearance between the counterparts of the first pins 250 and the second transfer member 504 while the first and second transfer members 502, 504 move out-of-phase with one another about the axis 110.

The method 700 can also include transferring force between a portion (e.g., a peripheral portion) of the second transfer member 132 and the second pins 300 (block 702*c*) (e.g., via a camming interaction therebetween) while the first and second transfer members 130, 132 move out-of-phase with one another about the axis 110. This can include contacting the second pins 300 and the second continuous sinusoidal profile defined by the second transfer member 132. Furthermore, this can include transferring force between the second lobes 454 and the second pins 300, such as by camming the second lobes 454 against the second pins 300. The contact between the second transfer member 132 and the second pins 300 can be at the second intermediate portions 260' of the second pins 300.

In at least some cases, the force transfer between the second transfer member 132 and the second pins 300 is preferential relative to force transfer (if any) between the second transfer member 132 and the first pins 250 throughout a complete rotational cycle of the gear assembly 112. The individual second pins 300 can avoid or otherwise reduce contact and/or force transfer with the first transfer member 130 while contacting and transferring force with the second transfer member 132. The lack of contact or otherwise non-preferential contact with the first transfer member 130 can be via the annular recesses 262' at the first intermediate portions 258' of the second pins 300. Relatedly, the method 700 can include maintaining clearance between the second pins 300 and the first transfer member 130 while the first and second transfer members 130, 132 move out-of-phase with one another about the axis 110. In the context of the pins 500 and the first and second transfer members 502, 504 (FIGS. 14-17), the pins 500 can include counterparts of the second pins 300 that avoid or otherwise reduce contact and/or force transfer with the first transfer member 502 while contacting and transferring force with the second transfer member 504. The lack of contact or otherwise non-preferential contact with the first transfer member 502 can be via the first troughs 510. Relatedly, the method 700 can include maintaining clearance between the counterparts of the second pins 300 and the first transfer member 502 while the first and second transfer members 502, 504 move out-of-phase with one another about the axis 110.

In connection with the force transfer between the first transfer member 130 and the first pins 250 and the force transfer between the second transfer member 132 and the second pins 300, the method 700 can include causing rotation of the individual first and second pins 250, 300 relative to the first and second supports 140, 142 while the first and second transfer members 130, 132 move out-of-phase with one another about the axis 110. In these and/or other cases, the method 700 can include rotatably carrying the first end portions 254, 254' of the individual first and second pins 250, 300 at respective ones of the roller bearings 350 at the first support 140 while the first and second transfer members 130, 132 move out-of-phase with one another about the axis 110. The method 700 can further include carrying the roller bearings 350 of the first roller bearing array 144 at the sockets 210 of the first support 140 and/or at the through holes 208 of the plate 200 of the first support 140 while the first and second transfer members 130, 132 move out-of-phase with one another about the axis 110. Likewise, the method 700 can include rotatably carrying the second end portions 256, 256' of the individual first and second pins 250, 300 at respective ones of the roller bearings 350 at the second support 142 while the first and second transfer members 130, 132 move out-of-phase with one another about the axis 110. The method 700 can further include carrying the roller bearings 350 of the second roller bearing array 146 at the sockets 210' of the second support 142 and/or at the through holes 208' of the plate 200' of the second support 142 while the first and second transfer members 130, 132 move out-of-phase with one another about the axis 110. The method 700 can further include directly contacting the first and second pins 250, 300 and the cylindrical outer surfaces 368 of the rollers 354 while the first and second transfer members 130, 132 move out-of-phase with one another about the axis 110.

Finally, the method 700 can include rotating an output member (block 702d), such as the crank 114. This too can occur while causing the first and second transfer members 130, 132 to move out-of-phase with one another about the axis 110. In some cases, rotating the output member is relative to a mount. For example, the link 104 (FIG. 2) can be a mount relative to which actuator 100 rotates the crank 114. In these and other cases, rotating the output member can be in response to force exerted by the first and second transfer members 130, 132 against the base 150 via the rods 152. Alternatively or in addition, the method 700 can include operating the actuator 100 in the opposite direction. For example, the method 700 can include rotating the first and second supports 140, 142 relative to a mount in response to force exerted by the first and second transfer members 130, 132 against the first and second supports 140, 142 via the first and second pins 250, 300. Regardless of the direction, operating the actuator 100 can cause an input-to-output reduction ratio. In at least some cases, the method 700 includes causing an input-to-output reduction ratio within a range from 20:1 to 40:1, such as from 25:1 to 35:1, via the gear assembly 112 or another gear assembly in accordance with at least some embodiments of the present technology.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms. References herein to any of receiving, determining, or generating information in accordance with various embodiments of the present technology encompass, when feasible, the others of receiving, determining, and generating the information and indicate that such operations can occur at least partially via the relevant computing subsystem.

Directional terms, such as "upper," "lower," "front," "back," "vertical," and "horizontal," may be used herein to express and clarify the relationship between various structures. It should be understood that such terms do not denote absolute orientation. The term "centroid" as used herein refers to a center-like data element for a given shape in three-dimensional space. There are several known approaches to calculating centroids including approaches of greater and lesser precision. No particular approach is contemplated herein. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A gear assembly comprising:
a first support extending circumferentially around an axis in a first plane intersecting the axis;
a second support extending circumferentially around the axis in a second plane intersecting the axis, wherein the first and second planes are spaced apart from one another along the axis;
a first transfer member including first lobes and first troughs circumferentially alternating in a third plane intersecting the axis, wherein an average circumferential span of the first lobes in the third plane is smaller than an average circumferential span of the first troughs in the third plane;
a second transfer member including second lobes and second troughs circumferentially alternating in a fourth plane intersecting the axis, wherein the third and fourth planes are between the first and second planes along the axis, wherein an average circumferential span of the second lobes in the fourth plane is smaller than an average circumferential span of the second troughs in the fourth plane; and
pins circumferentially distributed around the axis, individually extending between the first and second supports, and individually configured to rotate relative to the first and second supports as the first and second transfer members move out-of-phase with one another about the axis,
wherein the gear assembly is configured to transfer torque via the pins without any one of the pins simultaneously contacting the first and second transfer members.

2. The gear assembly of claim 1, wherein:
the gear assembly further comprises:
first roller bearings at the first support, and
second roller bearings at the second support; and
the pins individually extend between different respective pairs of one of the first roller bearings and one of the second roller bearings.

3. The gear assembly of claim 2, wherein:
the first support includes first sockets circumferentially distributed around the axis;
the first roller bearings are at least partially disposed within the first sockets;
the second support includes second sockets circumferentially distributed around the axis; and
the second roller bearings are at least partially disposed within the second sockets.

4. The gear assembly of claim 3, wherein:
the first support includes a first plate defining first through holes;
the first sockets are at the first through holes;
the second support includes a second plate defining second through holes; and
the second sockets are at the second through holes.

5. The gear assembly of claim 2, wherein the first and second roller bearings are drawn-cup needle roller bearings.

6. The gear assembly of claim 2, wherein:
the first and second roller bearings individually include:
rollers individually defining a cylindrical outer surface, an annular frame carrying the rollers; and
the pins contact the cylindrical outer surfaces of the rollers directly.

7. The gear assembly of claim 1, wherein:
the individual pins include:
a first end portion at the first support,
a second end portion at the second support,
a first intermediate portion between the first and second end portions, and
a second intermediate portion between the first intermediate portion and the second end portion;
and
the individual pins contact the first and second transfer members via the first and second intermediate portions, respectively.

8. The gear assembly of claim 1, wherein:
the gear assembly further comprises a carrier including a base and rods individually extending from the base;
the first transfer member defines first peripheral openings distributed circumferentially around the axis;
the second transfer member defines second peripheral openings distributed circumferentially around the axis; and
the individual rods extend through different respective pairs of one of the first peripheral openings and one of the second peripheral openings.

9. The gear assembly of claim 8, wherein:
the gear assembly further comprises:
a mount fixedly connected to the first and second supports, and
an output member fixedly connected to the base; and
the gear assembly is configured to rotate the output member relative to the mount in response to force exerted by the first and second transfer members against the base via the rods.

10. The gear assembly of claim 8, wherein:
the gear assembly further comprises a mount fixedly connected to the base; and
the gear assembly is configured to rotate the first and second supports relative to the mount in response to force exerted by the first and second transfer members against the first and second supports via the pins.

11. The gear assembly of claim 1, further comprising:
an input shaft configured to rotate about the axis; and
a first eccentric bearing carried by the input shaft, wherein the first transfer member defines a first central opening at which the first eccentric bearing is rotatably disposed; and
a second eccentric bearing carried by the input shaft, wherein the second transfer member defines a second central opening at which the second eccentric bearing is rotatably disposed.

12. The gear assembly of claim 1, wherein the gear assembly has an input-to-output reduction ratio within a range from 20:1 to 40:1.

13. A gear assembly comprising:
a first support extending circumferentially around an axis in a first plane intersecting the axis;
a second support extending circumferentially around the axis in a second plane intersecting the axis, wherein the first and second planes are spaced apart from one another along the axis;
a first transfer member including first lobes and first troughs circumferentially alternating in a third plane intersecting the axis;

a second transfer member including second lobes and second troughs circumferentially alternating in a fourth plane intersecting the axis, wherein the third and fourth planes are between the first and second planes along the axis; and pins circumferentially distributed around the axis, individually extending between the first and second supports, and individually configured to rotate relative to the first and second supports as the first and second transfer members move out-of-phase with one another about the axis, wherein:
    an average angle in the third plane between circumferentially neighboring pairs of the pins is no more than one third an average angle in the third plane between circumferentially neighboring pairs of the first lobes,
    an average angle in the fourth plane between circumferentially neighboring pairs of the pins is no more than one third an average angle in the fourth plane between circumferentially neighboring pairs of the second lobes, and
    the gear assembly is configured to transfer torque via the pins without any one of the pins simultaneously contacting the first and second transfer members.

14. The gear assembly of claim 13, wherein:
the gear assembly further comprises:
    first roller bearings at the first support, and
    second roller bearings at the second support; and
the pins individually extend between different respective pairs of one of the first roller bearings and one of the second roller bearings.

15. The gear assembly of claim 14, wherein:
the first support includes first sockets circumferentially distributed around the axis;
the first roller bearings are at least partially disposed within the first sockets;
the second support includes second sockets circumferentially distributed around the axis; and
the second roller bearings are at least partially disposed within the second sockets.

16. The gear assembly of claim 14, wherein the first and second roller bearings are drawn-cup needle roller bearings.

17. A gear assembly comprising:
a first support extending circumferentially around an axis in a first plane intersecting the axis;
a second support extending circumferentially around the axis in a second plane intersecting the axis, wherein the first and second planes are spaced apart from one another along the axis;
a first transfer member including first lobes and first troughs circumferentially alternating in a third plane intersecting the axis;
a second transfer member including second lobes and second troughs circumferentially alternating in a fourth plane intersecting the axis, wherein the third and fourth planes are between the first and second planes along the axis; and
pins circumferentially distributed around the axis, individually extending between the first and second supports, and individually configured to rotate relative to the first and second supports as the first and second transfer members move out-of-phase with one another about the axis, wherein:
    a total quantity of the first lobes is at most one third a total quantity of the pins,
    a total quantity of the second lobes is at most one third the total quantity of the pins, and
    the gear assembly is configured to transfer torque via the pins without any one of the pins simultaneously contacting the first and second transfer members.

18. The gear assembly of claim 17, wherein:
the gear assembly further comprises:
    first roller bearings at the first support, and
    second roller bearings at the second support; and
the pins individually extend between different respective pairs of one of the first roller bearings and one of the second roller bearings.

19. The gear assembly of claim 18, wherein:
the first support includes first sockets circumferentially distributed around the axis;
the first roller bearings are at least partially disposed within the first sockets;
the second support includes second sockets circumferentially distributed around the axis; and
the second roller bearings are at least partially disposed within the second sockets.

\* \* \* \* \*